US008025413B2

(12) United States Patent
Hsu et al.

(10) Patent No.: US 8,025,413 B2
(45) Date of Patent: Sep. 27, 2011

(54) HEAT-DISSIPATING STRUCTURE OF HOUSING AND PROJECTION DEVICE HAVING SAME

(75) Inventors: Wei-Ping Hsu, Taipei Hsien (TW); Chien-Fu Chen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 501 days.

(21) Appl. No.: 12/183,044

(22) Filed: Jul. 30, 2008

(65) Prior Publication Data

US 2010/0039623 A1 Feb. 18, 2010

(30) Foreign Application Priority Data

Feb. 28, 2008 (CN) .......................... 2008 1 0300419

(51) Int. Cl.
*G03B 21/16* (2006.01)
*G03B 21/18* (2006.01)
(52) U.S. Cl. ................ 353/52; 353/60; 353/61
(58) Field of Classification Search ................ 353/52, 353/60, 61
See application file for complete search history.

(56) References Cited

U.S. PATENT DOCUMENTS

| 2,703,045 | A * | 3/1955 | Gilbert et al. ............... 454/251 |
|---|---|---|---|
| 6,793,346 | B2 * | 9/2004 | Nakano et al. ............... 353/119 |
| 6,824,272 | B2 * | 11/2004 | Hsu et al. ...................... 353/61 |
| 7,358,119 | B2 * | 4/2008 | McLellan et al. ............ 438/127 |
| 7,815,315 | B2 * | 10/2010 | Momose et al. .............. 353/52 |
| 2005/0073658 | A1 * | 4/2005 | Chang et al. ................. 353/52 |
| 2007/0115438 | A1 * | 5/2007 | Tsubura ........................ 353/57 |
| 2008/0043439 | A1 * | 2/2008 | Lin et al. ..................... 361/700 |
| 2009/0122268 | A1 * | 5/2009 | Shen et al. .................... 353/52 |

FOREIGN PATENT DOCUMENTS

CN 1609700 A 4/2005

* cited by examiner

*Primary Examiner* — Georgia Y Epps
*Assistant Examiner* — Magda Cruz
(74) *Attorney, Agent, or Firm* — Zhigang Ma

(57) ABSTRACT

A heat-dissipating structure of a housing is disclosed. The housing defines an opening that is embedded with the heat-dissipating structure. The heat-dissipating structure includes a number of metal slats, a number of connection members, and a supporting frame. The metal slats are spaced and angled to form air channels and fixed to each other via the connection members. The combination of the metal slats and connection members are supported by the supporting frame.

17 Claims, 2 Drawing Sheets

HEAT-DISSIPATING STRUCTURE OF HOUSING AND PROJECTION DEVICE HAVING SAME

BACKGROUND

1. Technical Field

The invention relates to heat-dissipation of projection devices and, particularly, to a heat-dissipating structure of a housing and a projection device having the same.

2. Description of the Related Art

A projection device typically includes a housing and various heat generating components, such as a light source and high-power electronic elements, which are accommodated within the housing. The housing is commonly made of plastic material to reduce costs. On one hand, in order to provide sufficient mechanical strength for protecting components accommodated therein, the housing is typically formed with certain thickness. On the other hand, the housing may define slots therein, which allow air flow to carry heat generated by the heat generating components away from the housing. The slots defined in the housing of certain thickness also have a large dimension in depth, and therefore have great wind resistance. This may adversely affect the heat dissipation rate of the projection devices.

Therefore, it is desirable to provide a heat-dissipating structure of a housing and a projection device having same, which can overcome the above mentioned problem.

SUMMARY

In an exemplary embodiment, a heat-dissipating structure of a housing is disclosed. The housing defines an opening that is embedded with the heat-dissipating structure. The heat-dissipating structure includes a number of metal slats, a number of connection members, and a supporting frame. The metal slats are spaced and angled to form air channels therebetween and fixed to each other by the connection members. The combination of metal slats and connection members are supported by the supporting frame.

DETAILED DESCRIPTION OF THE EMBODIMENTS

Embodiments of the present heat-dissipating structure of the housing and projection device will now be described in detail with references to the accompanying drawings.

Figure 1:
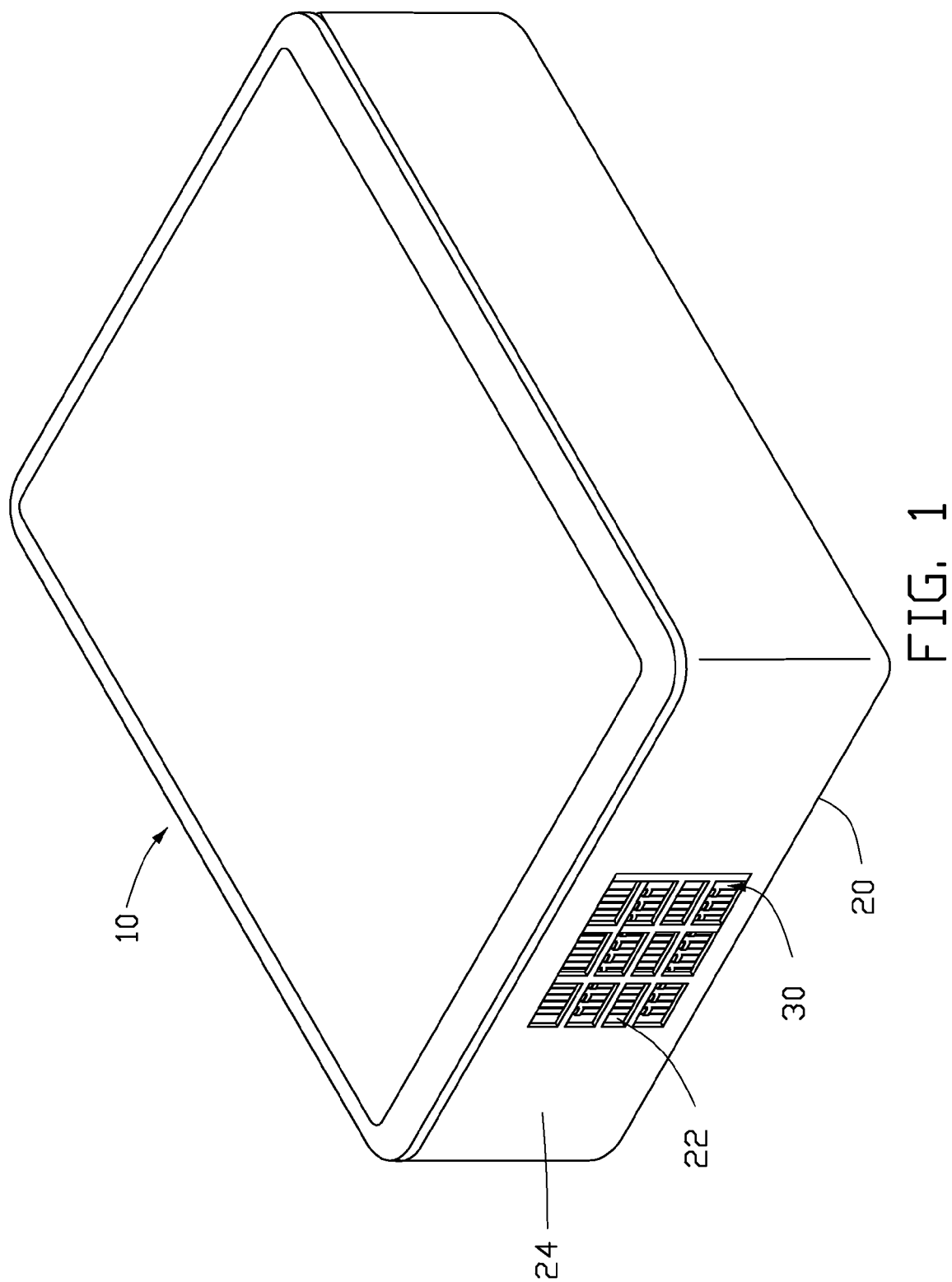
FIG. 1 is an isomeric, schematic view of a projection device including a heat-dissipating structure, according to an exemplary embodiment.

Referring to FIG. 1, a projection device 10, such as a digital light processing (DLP) projector or a liquid crystal display (LCD) projector, according to an exemplary embodiment, includes a housing 20 and various heat-generating components (not shown). The heat-generating components, such as a light source and high-power electronic elements, are accommodated within the housing 20. The projection device 10 may generate a great amount of heat when operated. For the purpose of heat-dissipation of the projection device 10, the housing 20 defines an opening 22 in a surface 24 thereof, and further includes a set of heat-dissipating structures 30 embedded in the opening 22. In other alternative embodiments, the housing 20 can include only one heat-dissipating structure fitting into the opening 22.

Figure 2:
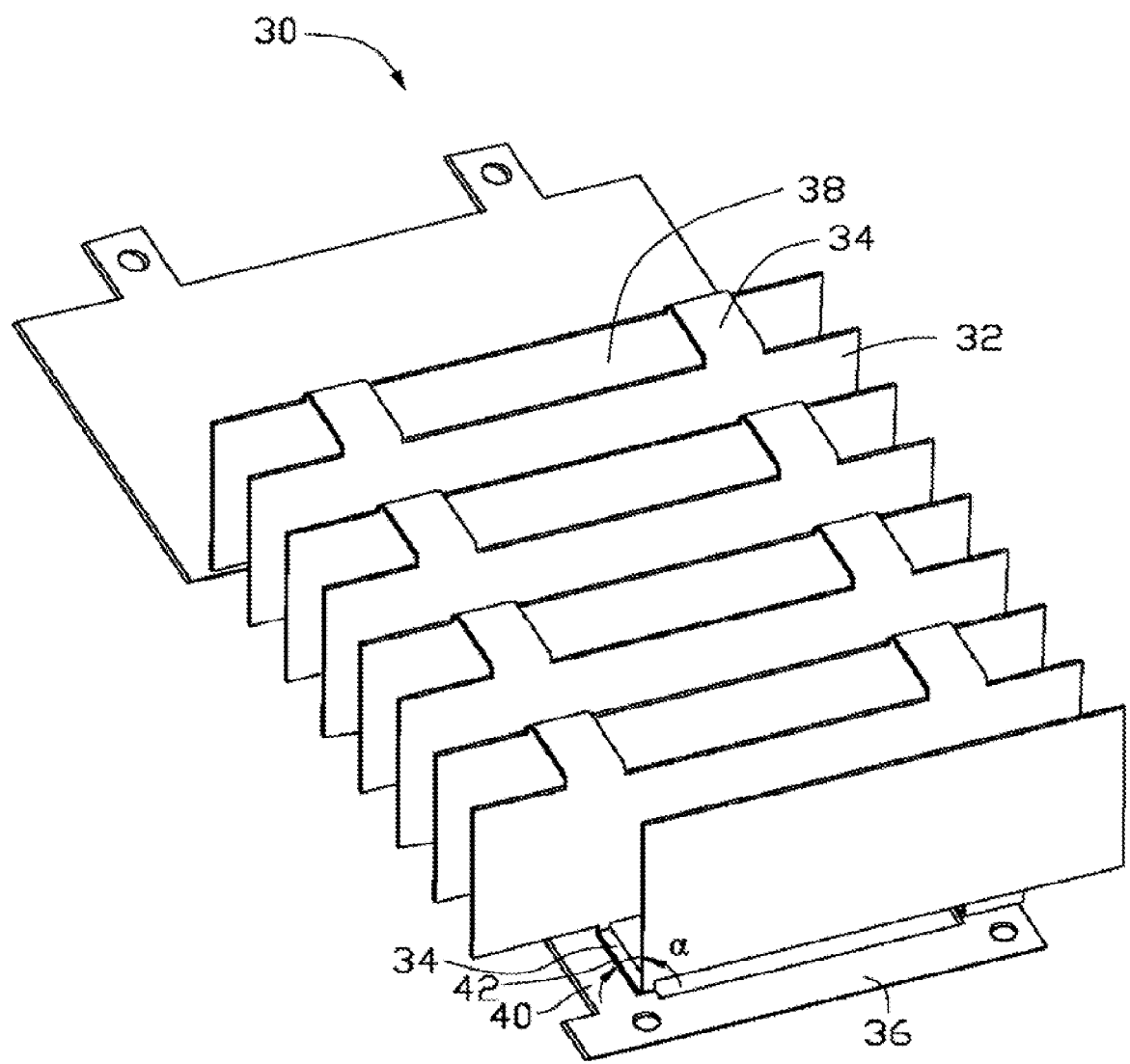
FIG. 2 is an isomeric, partial view of the heat-dissipating structure of FIG. 1.

Referring to FIG. 2, the heat-dissipating structure 30 includes a number of metal slats 32, a number of connection members 34, and a supporting frame 36. The metal slats 32 are equidistantly spaced to form air channels 38 therebetween and angled with respect to the supporting frame 36. The metal slats 20 are substantially parallel to each other and the air channels 38 are substantially aligned to the flow direction of air flow generated within the housing 20. The connection members 34 are configured for connecting the metal slats 32. The supporting frame 36 is configured for supporting the combination of the metal slats 32 and the connection members 34.

It should be understood that the arrangement of the metal slats 32 is not limited by this embodiment. The metal slats 32 are not necessarily equidistantly spaced and substantially parallel to each other in other alternative embodiments.

The metal slats 32 are flat in shape in this embodiment. But it should be understood that in other alternative embodiments, the metal slats 32 can also be curved to reduce wind resistance of the heat-dissipation structure 30 based on aerodynamics. Additionally, the metal slats 32 can be made from aluminium, iron, copper, or any alloy thereof that has great mechanical strength. Therefore, the metal slats 32 can be formed with a small thickness but still strong enough to protect the components accommodated within the housing 20.

The connection members 34 also can be made from aluminium, iron, copper, or any alloy thereof, and can be integrally formed with the metal slats 32 to save an assembly process of the metal slats 32 and the connection members 34.

In this embodiment, each two adjacent metal slats 32 are bridged by two strip-shaped connection members 34. Specifically, the alternating two adjacent slats 32 are bridged at a same side edge thereof. The supporting frame 36 has two strips 40 for supporting and maintaining the connection members 34 adjacent thereto via black epoxy 42. The strips 40 are slim in width to reduce the wind resistance of the heat-dissipating structure 30. The connection features of the metal slats 32, the connection members 34, and the supporting frame 36 are not limited by this embodiment. For example, only one connection member 34 and one strip 40 can be used to bridge two metal slats 32 and support the metal slats 32 respectively. Alternatively, one connection member 34 is used to connect all the metal slats 32, or all connection members 34 are omitted and the metal slats 32 are directly fixed to the supporting frame 36.

The greater the included acute angle α between the metal slats 32 and the supporting frame 36 is, the smaller the wind resistance of the heat-dissipating structure 30 can be achieved. On the other hand, if the included angle α is too great, the light shielding property of the heat-dissipating structure 30 suffers. In order to achieve excellent light shielding property, the metal slats 32 should be positioned in a manner that shadows of the slats 32 orthographically projected on the surface 24 of the housing 20 overlap each other. In order to obtain both benefits of wind resistance and light shielding properties, the included angle α should be set depending on the height and the thickness of the metal slats 32. In this embodiment, the height ranges from 11.5~12.5 mm, the thickness of the metal slats 32 ranges from 0.45 mm to 0.55 mm, and the included angle α is beneficially limited to 48~57 degrees.

For further improvement of the light shielding property, the surface of the metal slats 32 and connection members 34 can be textured, e.g., black anodized, to diffuse light directed thereto, thereby decreasing light leakage of the heat-dissipating structure 30.

It will be understood that the above particular embodiments and methods are shown and described by way of illustration only. The principles and the features of the present invention may be employed in various and numerous embodiments thereof without departing from the scope of the invention as claimed. The above-described embodiments illustrate the scope of the invention but do not restrict the scope of the invention.

What is claimed is:

1. A heat-dissipating structure of a housing of a projection device, the housing comprising a surface, the surface defining an opening therein, the heat-dissipating structure being embedded within the opening, the heat-dissipating structure comprising:
   a plurality of metal slats equidistantly spaced to form a plurality of air channels therebetween;
   a plurality of strip-shaped connection members, the alternating two adjacent slats being bridged by two strip-shaped connection members at a same side edge thereof; and
   a supporting frame comprising two strips, the two strips being configured for maintaining the connection members adjacent thereto, the metal slats being angled with respect to the supporting frame so that the metal slats are substantially parallel to each other and the air channels are substantially aligned to the flow direction of air flow generated with the projection device,
   wherein the height of each of the plurality of metal slats ranges from about 11.5 to about 12.5 mm, the thickness of the metal slats ranges from about 0.45 to about 0.55 mm, and the included angles between each of the plurality of metal slats and the supporting frame is in the range of about 48 to about 57 degrees.

2. A heat-dissipating structure of a housing, comprising:
   a plurality of metal slats spaced to form a plurality of air channels therebetween; and
   a supporting frame configured for supporting the metal slats,
   wherein the height of each of the plurality of metal slats ranges from about 11.5 to about 12.5 mm, the thickness of the metal slats ranges from about 0.45 to about 0.55 mm, and the included angles between each of the plurality of metal slats and the supporting frame is in the range of about 48 to about 57 degrees.

3. The heat-dissipating structure as claimed in claim 2, wherein the plurality of metal slats are equidistantly spaced.

4. The heat-dissipating structure as claimed in claim 2, wherein the plurality of metal slats are angled with respect to the supporting frame.

5. The heat-dissipating structure as claimed in claim 2, wherein the plurality of metal slats are substantially parallel to each other.

6. The heat-dissipating structure as claimed in claim 2. wherein the plurality of metal slats are flat in shape.

7. The heat-dissipating structure as claimed claim 2, wherein the plurality of metal slats are made of a material selected from the group consisting of aluminium, copper, iron, and alloy thereof.

8. The heat-dissipating structure as claimed claim 2, further comprising a connection member, the connection members being configured for connecting the plurality of metal slats.

9. The heat-dissipating structure as claimed claim 8, wherein the connection member is made of a material selected from a group consisting of aluminium, copper, iron, and alloy thereof.

10. The heat-dissipating structure as claimed claim 8, wherein the plurality of metal slats and the connection member are integrally formed.

11. The heat-dissipating structure as claimed claim 8, wherein the connection member is strip-shaped.

12. The heat-dissipating structure as claimed claim 2, further comprising a plurality of connection members, the alternating two adjacent slats being bridged by a connection member at a same side edge thereof, the supporting frame comprising a strip, the strip supporting the connection members adjacent thereto.

13. The heat-dissipating structure as claimed claim 12, wherein the strip supports the connection members adjacent thereto via epoxy.

14. The heat-dissipating structure as claimed claim 13, wherein the epoxy is black in color.

15. The heat-dissipating structure as claimed claim 2, wherein the plurality of metal slats are black anodized.

16. A projection device comprising:
   a housing comprising a surface, and a heat-dissipating structure, the surface defining an opening therein, the heat-dissipating structure being embedded in the opening and comprising:
   a plurality of metal slats spaced to form a plurality of air channels therebetween; and
   a supporting frame configured for supporting the metal slats,
   wherein the height of each of the plurality of metal slats ranges from about 11.5 to about 12.5 mm, the thickness of the metal slats ranges from about 0.45 to about 0.55 mm, and the included angles between each of the plurality of metal slats and the supporting frame is in the range of about 48 to about 57 degrees.

17. The projection device as claimed in claim 16, wherein the air channels are substantially aligned to the flow direction of air flow generated within the projection device.

* * * * *